July 15, 1952

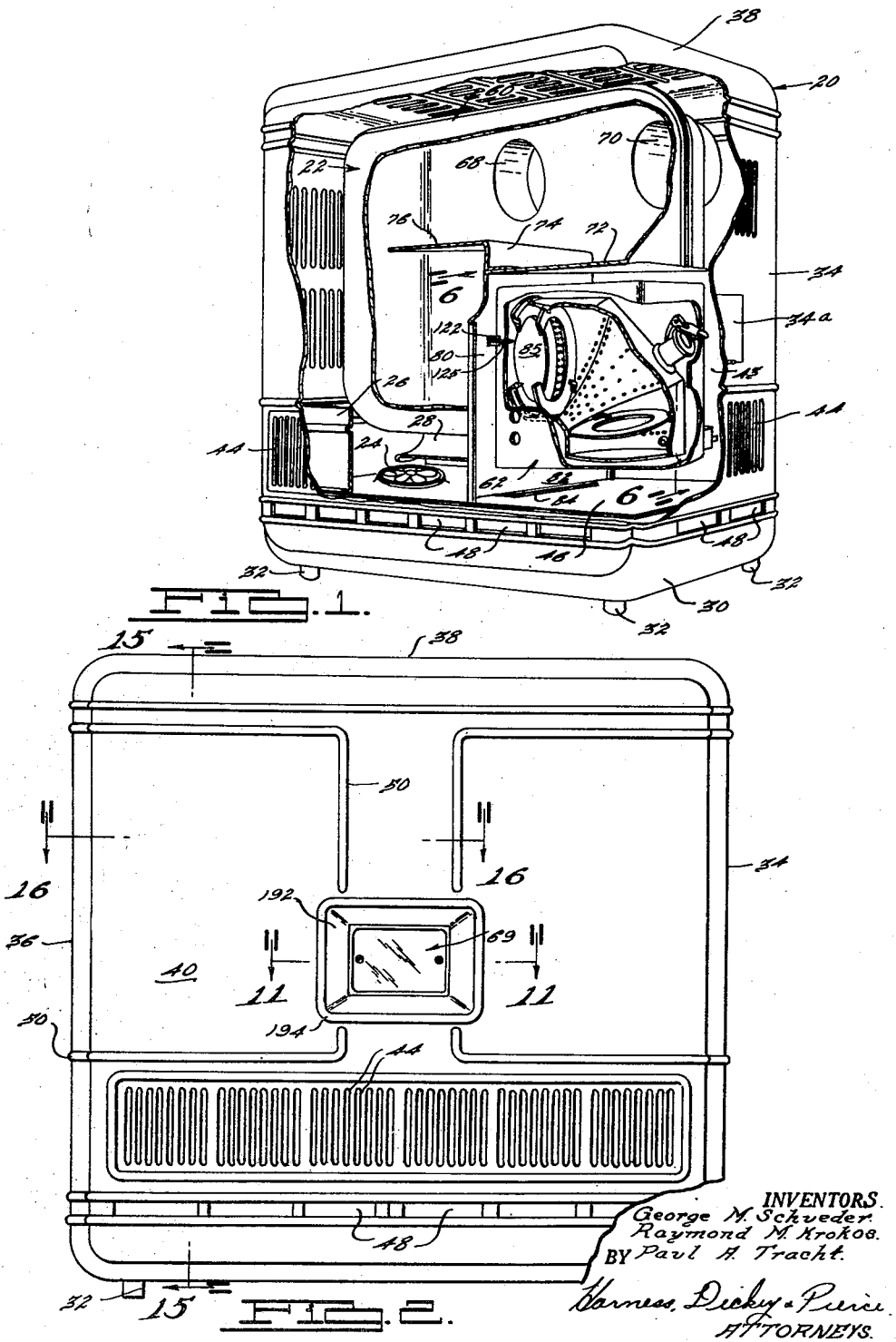

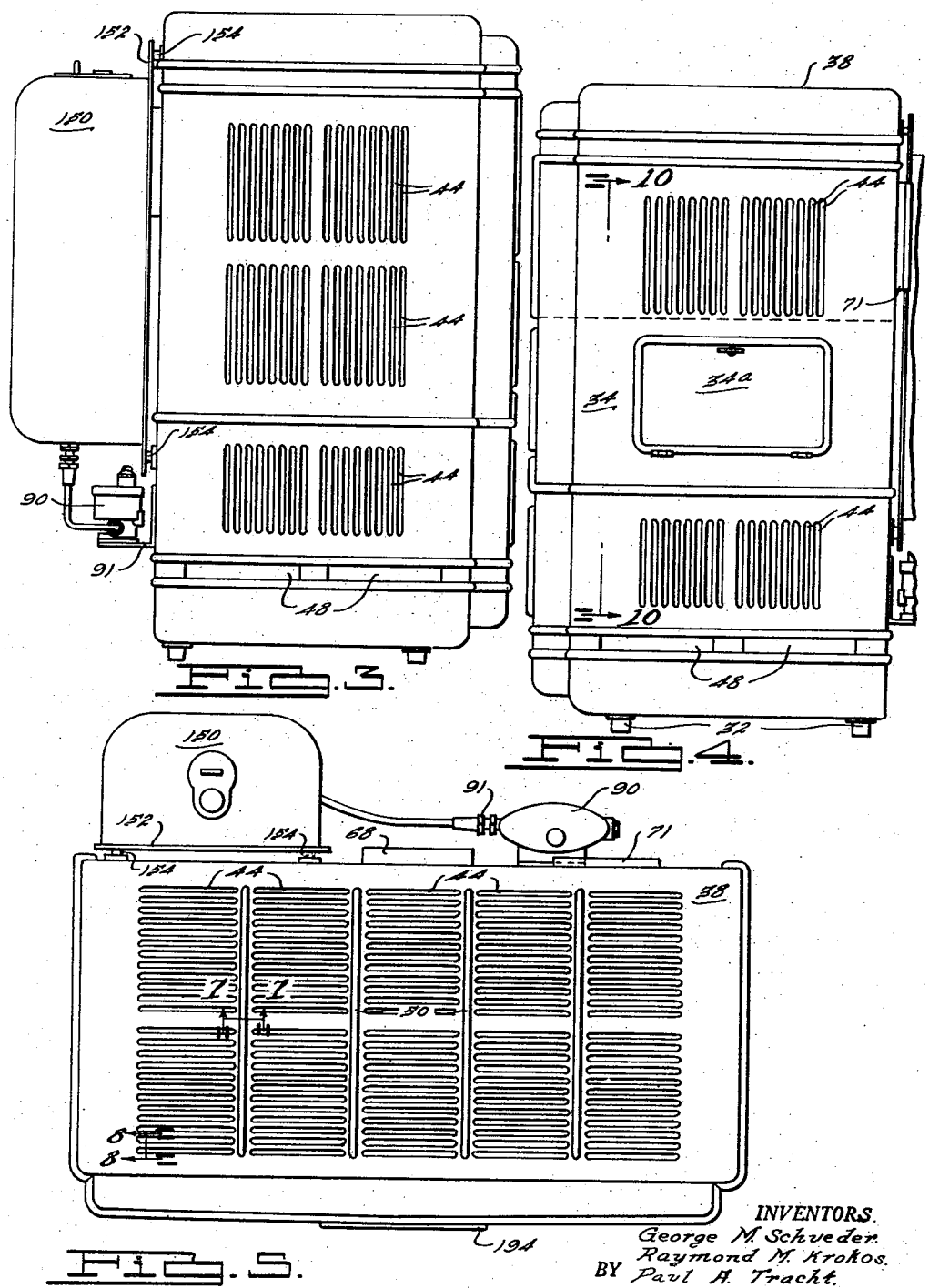

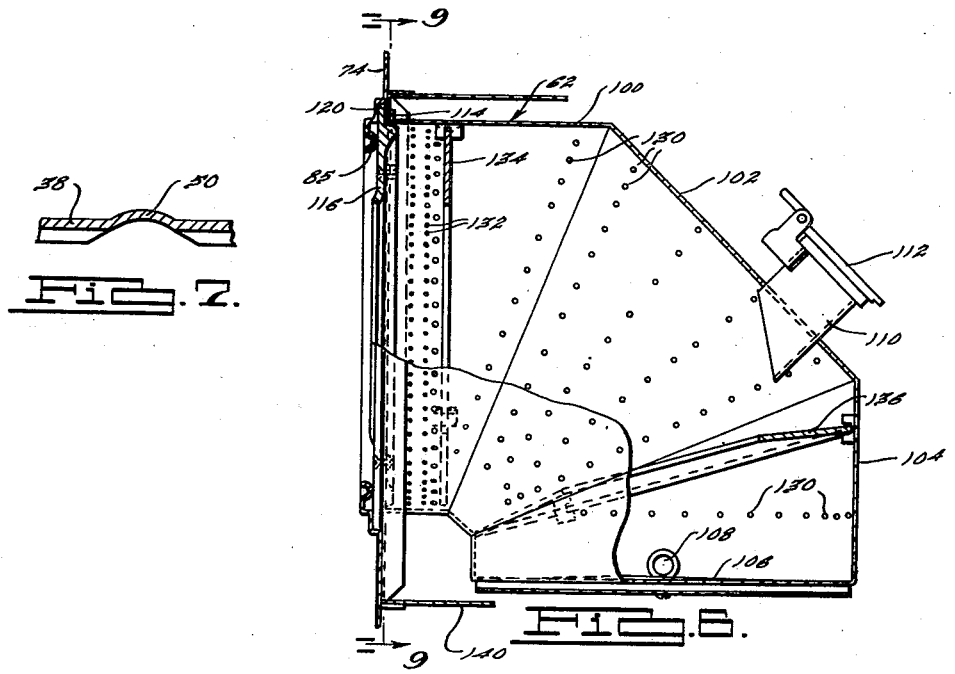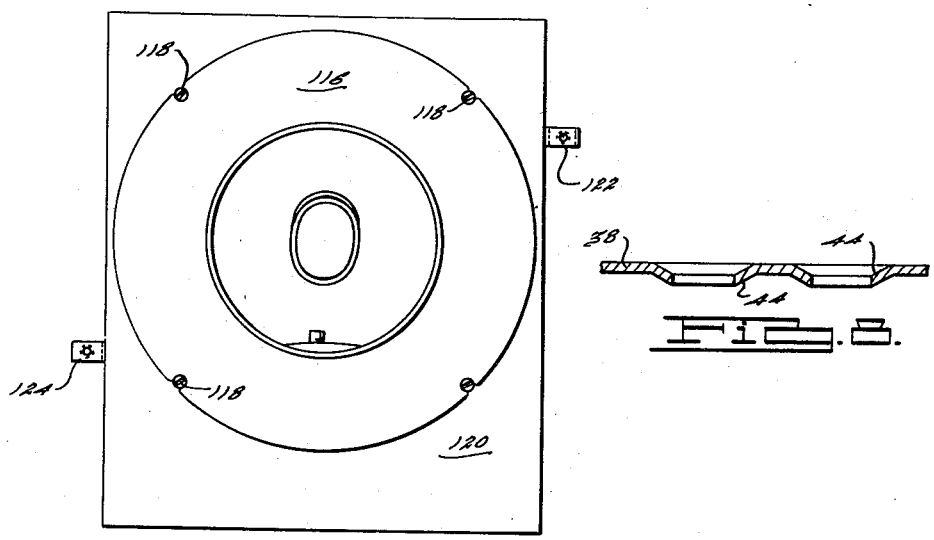

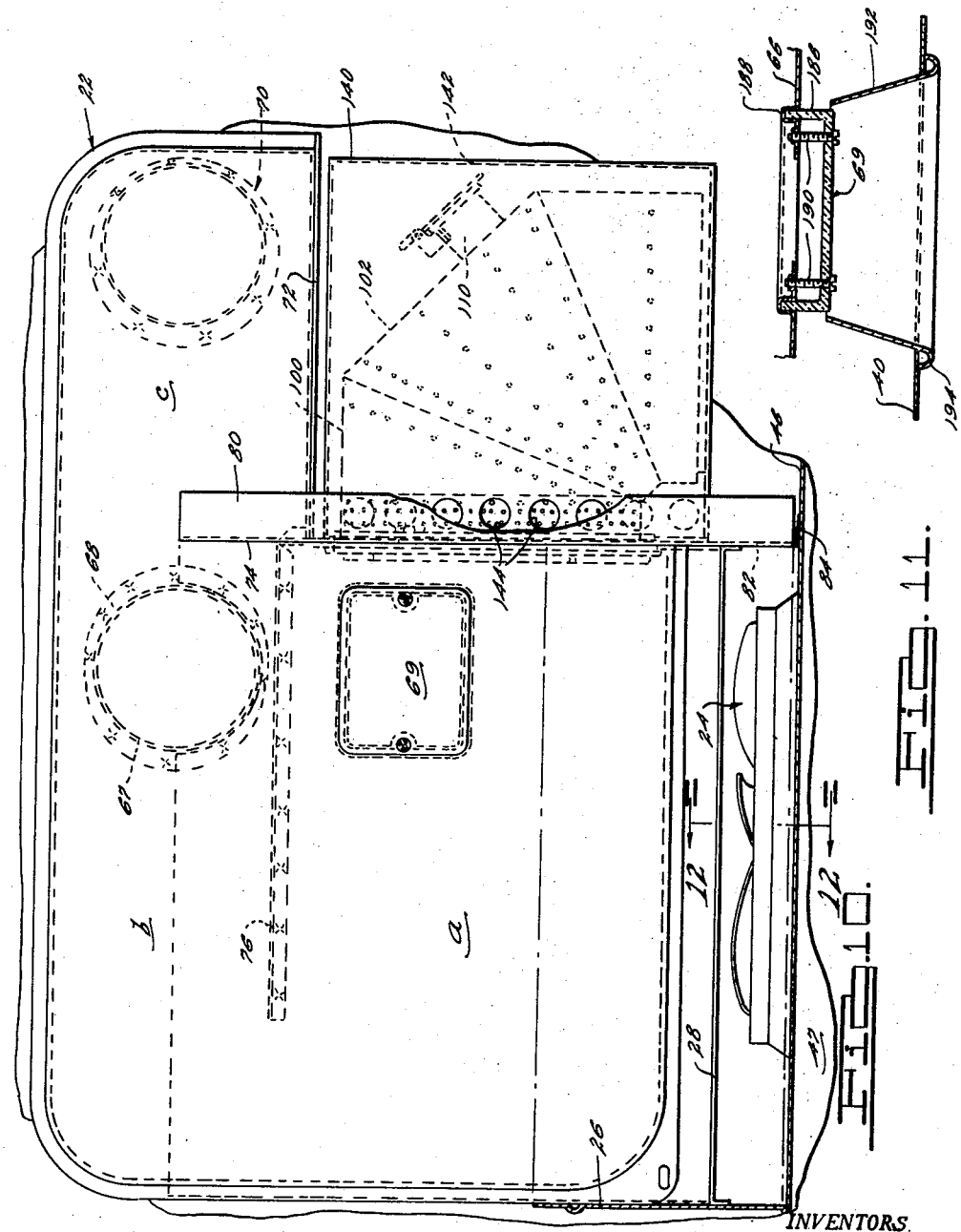

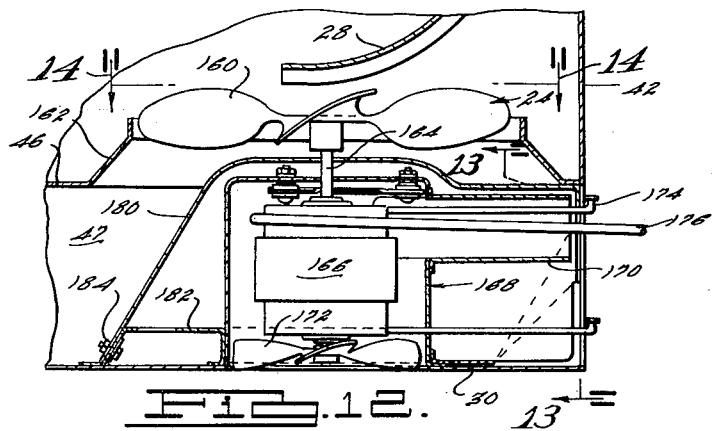
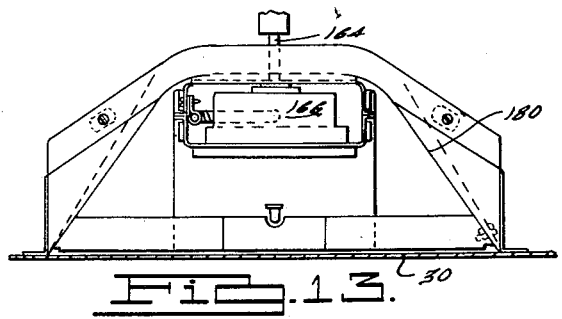
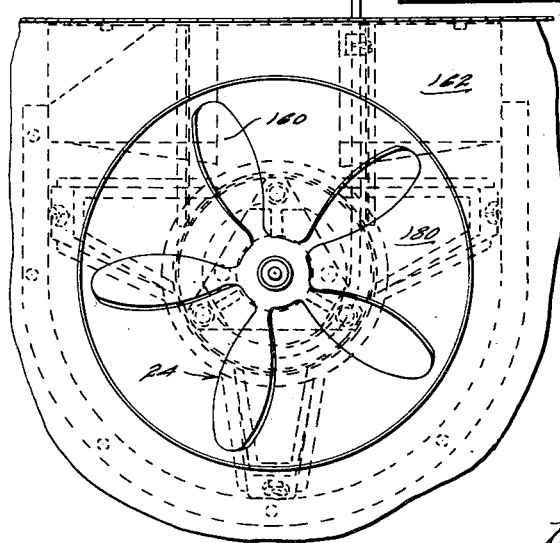

G. M. SCHUEDER ET AL 2,603,206

CONVECTION AND FORCED AIR FLOW
WARM AIR SPACE HEATING FURNACE

Filed July 2, 1948

INVENTORS.
George M. Schueder
Raymond M. Krokos.
BY Paul A. Tracht
Harness, Dickey & Pierce.
ATTORNEYS.

INVENTORS.
George M Schueder
Raymond M Krokos.
BY Paul H. Tracht.
Harness Dickey & Pierce.
ATTORNEYS.

Patented July 15, 1952

2,603,206

UNITED STATES PATENT OFFICE 2,603,206

CONVECTION AND FORCED AIR FLOW WARM AIR SPACE HEATING FURNACE

George M. Schueder, Dearborn, and Raymond M. Krokos and Paul A. Tracht, Detroit, Mich., assignors to Evans Products Company, Detroit, Mich., a corporation of Delaware Application July 2, 1948, Serial No. 36,738

8 Claims. (Cl. 126—110)

The present invention relates to heating apparatus, and more particularly as illustrated herein to floor supported cabinet types of unit space heaters, which types are widely used at the present time for, among other purposes, the direct heating of rooms, small houses, and the like. In its preferred practice, the invention embodies, and constitutes improvements upon, the inventions disclosed and claimed in United Statest Patent No. 2,268,778, granted January 6, 1942, and in the copending application of the present applicant Schueder, Serial No. 35,917, filed June 29, 1948. The present invention is also illustrated as utilizing a generally horizontally discharging vaporizing pot burner embodying the invention disclosed and claimed in the copending application of the present applicant Schueder, jointly with Harrison P. Zimmer, Serial No. 740,454, filed April 9, 1947.

Primary objects of the present invention are to provide a heating apparatus which provides noticeably more efficient use of the heat transfer surfaces of a combustion unit and in which, more particularly, the undersurface, as well as the sides and the upper surface of the combustion unit serve as heat transfer surfaces; to provide such an apparatus having improved means whereby heat may be extracted from the aforesaid heat transfer surfaces, by direct radiation, by gravity circulation, and by forced circulation, and delivered to a surrounding space through a wide arc of 180° or more and at a desirably low level with respect to the floor of such surrounding space; to provide such a heating apparatus wherein the undersurface of the combustion unit comprises the upper boundary of an air circulating passage, so that air traversing this passage is directly heated by heat extracted from such undersurface; to provide such a heating apparatus including a fan or equivalent means for forcing air through a said passage and for delivering it directly into the surrounding space throughout a desirably wide arc and at a desirably low level with respect to the floor of such space; to provide such an apparatus embodying an enclosing cabinet, the combustion unit having its undersurface located relatively low in the cabinet, whereby air that has been heated by passing over the said undersurface can be discharged directly into a surrounding space at low level, without requiring that such heated air be moved to any substantial degree in a contrathermal (downward) direction; and to provide such a heating apparatus wherein the enclosing structure for the combustion unit is such that heat may be delivered from the combustion unit at low level, by direct radiation from the lower portions of the combustion unit as well as by forced circulation and in which, preferably, all heat transfer surfaces of the combustion unit may be efficiently used to heat the surrounding space by gravity circulation of air past the combustion unit.

Further important objects of the present invention are to provide a combustion unit which comprises, in addition to a burner of the vaporizing type, an expansion chamber having a drum which defines a plurality of retrovertly arranged axially successive passages through which the heated gases are caused to flow in passing from the burner outlet to the flue, whereby for a given length of drum, the length of the path traversed by the heated gases may be substantially increased; to provide such a heating apparatus wherein a portion of the drum serves as a draft regulator chamber, into which a draft regulator opens, and the walls of which chamber are utilized as heat transfer surfaces; to provide such a heating apparatus wherein, for descriptive purposes, the combustion unit may be regarded as quadrangular, a first quadrant thereof being occupied by a burner unit, and the remaining three quadrants being occupied by the drum or expansion chamber; to provide such a heating apparatus wherein such three quadrants are divided into a retroverted passage for gases heated by the burner, the flue connection and the draft regulator being associated with a second pass of such passage; and to provide such a heating apparatus wherein the under side, as well as the side and upper surfaces of the drum are utilized as heat transfer surfaces, from which heat may be extracted both by radiation and by convection currents.

Further and more detailed objects of the invention appear in the following description and the appended claims. In the drawings, which illustrate preferred embodiments of the invention:

Figure 1 is a view in perspective, with certain of the parts broken away, of a preferred embodiment of the invention;

Figures 2, 3, 4 and 5 are views, respectively, in front elevation, one end elevation, the opposite end elevation, and top plan, of the structure of Figure 1;

Figure 6 is a view partly in side elevation and partly in section of the burner unit employed in the structure of Figure 1;

Figure 7 is a fragmentary sectional view, taken along the line 7—7 of Figure 5;

Figure 8 is a fragmentary view in section, taken along the line 8—8 of Figure 5;

Figure 9 is a view in end elevation of the burner unit, taken along the line 9—9 of Figure 6;

Figure 10 is an interior view, taken along the line 10—10 of Figure 4, and showing the combustion unit in side elevation;

Figure 11 is a fragmentary view in horizontal section, taken along the line 11—11 of Figure 2;

Figure 12 is a fragmentary view in vertical section, taken along the line 12—12 of Figure 10, and illustrating details of the fan unit;

Figure 13 is a view in side elevation of the fan unit taken along the line 13—13 of Figure 12;

Figure 14 is a plan view of the fan unit;

Figure 15:
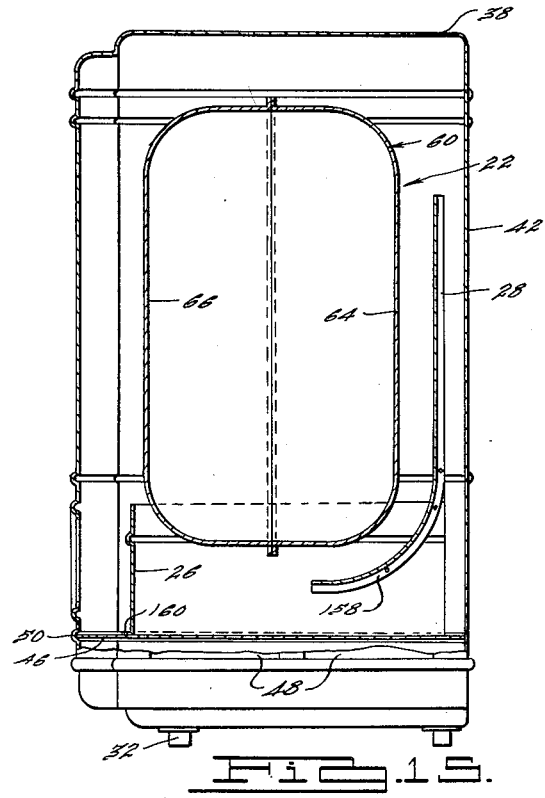
Figure 15 is a view in vertical section, taken along the line 15—15 of Figure 2.
Figure 16:
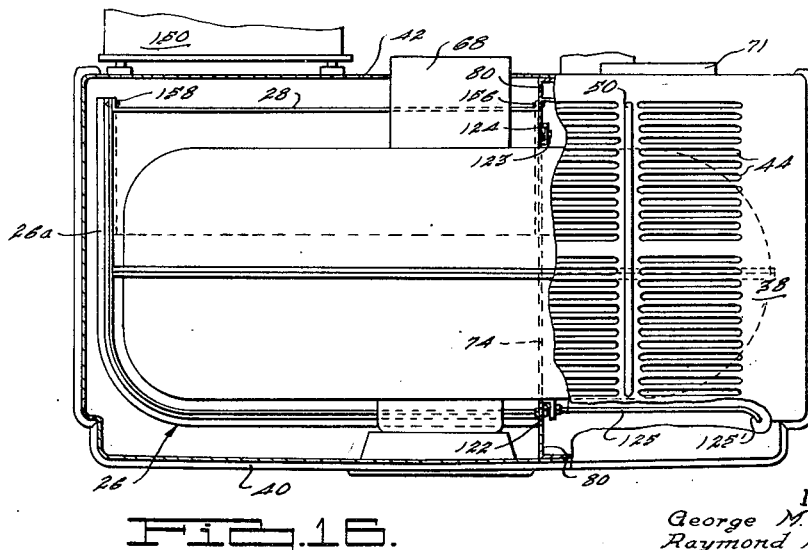
Figure 16 is a top plan view of the structure of Figure 1, with certain of the parts broken away, so as to represent a view in horizontal section, taken along the line 16—16 of Figure 2.

It will be appreciated from a complete understanding of the invention, that in a generic sense, the improvements thereof may be embodied in heating apparatuses of widely varying types and sizes, adapted for a wide variety of different applications. Examples of such applications include floor furnaces, as well as the floor supported cabinet type space heaters which are illustrated herein.

Referring first to the embodiment of Figures 1 through 16, the structure as a whole comprises generically, a floor supported enclosing cabinet 20, a combustion unit 22 which is housed within and supported by the cabinet 20, and means comprising a fan unit 24 and front and rear baffles 26 and 28, for controlling the delivery to the surrounding space, of heat extracted from the hereinafter described heat transfer surfaces of the combustion unit 22. Generally stated, the arrangement is such that, when the fan unit is not in operation, the heater functions as a gravity circulator. When the fan is operating, the heater functions as a forced circulator and heat is delivered to the surrounding room at low level, and throughout a wide arc which includes both ends as well as the front of the heater cabinet. Under both conditions of operation, the structure has the fundamental advantage that the underside as well as the sides and top surfaces of the combustion unit function as heat transfer surfaces. Under both conditions of operation, further, by virtue of the low level of the combustion unit within the cabinet, heat is extracted from the combustion unit and delivered by direct radiation at low level and throughout the just-mentioned wide arc.

Considering the above-mentioned elements of the heater in more detail, the enclosing cabinet 20 is of the commercially advantageous, generally rectangular, lowboy type. Preferably and as illustrated, the cabinet walls are composed of relatively light gauge sheet metal. Individually formed sections thereof may be secured together in any suitable way, as by spot welding, to define the completed cabinet. These individual sections include a generally upwardly presenting pan-like lower section 30, to which the individual supporting legs 32 are secured; end sections 34 and 36; a downwardly presented pan-like top section 38; and a front section 40. The rear face of the cabinet is enclosed by a panel 42. The top, end, and front panels are illustrated as being provided with grills which are defined by relatively long slot-like louvers 44 which may be and preferably are formed by combined piercing and drawing operations, as shown more clearly in Figure 8.

As will be understood from further description, the upper louvers 44 serve primarily as discharge openings for air which is heated by gravity circulation, and may serve as air inlet openings under conditions of forced circulation. The lower openings 44, at the front and at the two ends of the cabinet, serve primarily as air inlet openings under conditions of both gravity and forced circulation. Additionally, the front and end sections are provided, below the level of the openings 44, and also below the level of the floor panel 46, with a series of generally rectangular apertures 48. Apertures 48 open into the chamber space which is defined by the floor panel 46 (which is actually a false floor and extends throughout the full length and depth of the cabinet) and the upwardly presenting pan-like base section 30. This chamber space functions, in the illustrated embodiment, as a plenum chamber, into which heated air is drawn by the fan unit 24, and from which such heated air is discharged through the apertures 48.

It will be recognized that the louvers 44 act to reinforce and strengthen the relatively light gauge sheet metal sections which make up the cabinet. Further reinforcement, as well as decorative effect, is achieved by the ribs 50. It will be noticed from Figure 15 that the previously identified floor panel 46 is seated within certain of the lower ribs 50 of the end and front panels.

The previously mentioned combustion unit 22 consists of a generally L-shaped expansion chamber or drum 60, and the previously mentioned horizontally discharging vaporizing type pot burner 62, which is illustrated as being of the type specifically described and claimed in the aforesaid copending application Serial No. 740,454, filed April 9, 1947. In accordance with the present invention, the drum 60 may be and preferably is formed of a pair of complemental sections 64 and 66, which are identical with the exception that section 64 is pierced at 67 to accommodate the flue connection 68, and at 70 to accommodate the draft regulator 71 and that section 66 is apertured to accommodate an inspection window 69. Both sections represent, for purposes of description, the second, third and fourth quadrants of the previously mentioned quadrangular combustion unit, and are notched out to define the first quadrant, which is occupied by the burner unit 62. The horizontal surface of the notched out portion of the drum is closed by a panel 72, and the vertical portion thereof is closed by a panel 74. The panel 74 extends, within the drum, to a point above the level of the panel 72, and is provided with a horizontally turned dividing portion 76, which extends to within a short distance of the end of the drum. Portion 76 thus constitutes a baffle which divides the drum into two generally parallel retrovertly arranged gas passages. In the illustrated embodiment, these passages are vertically spaced although it will be appreciated that in the broader aspects of the invention, the drum 60 may be turned on its side, so that these passages lie in horizontally spaced relation.

As illustrated also, the panel 74 is provided with laterally projecting wing portions 80, which project from the side walls of the drum to the front and rear panels. The front wing 80 may be and preferably is permanently secured to the front panel 40, and the rear wing 80 may be and preferably is similarly connected to the rear panel 42. Additionally, the panel 74 is provided with a downwardly projecting portion 82, having a turned flange 84, by which it is connected to the floor panel 46. The vertical portion of panel 74 is centrally apertured as indicated at 85 to define an opening through which the burner unit 62 discharges heated gases into the expansion chamber. Panel 74 also serves as a mounting for burner unit 62 (Figure 6) which unit is detachably connected thereto. A door portion 43 of the rear panel 42 of the cabinet is removable to afford convenient access to the burner and its detachable connections and the burner unit 62 is readily removable through the door for maintenance or other purposes.

It will be appreciated from the foregoing that the panel 74, in addition to cooperating with panel 72, in forming a closure for the expansion chamber, also serves to support the entire combustion unit 22 within the cabinet 20. In addition, by extending completely across the cabinet, and to a height therein which is near the top of the cabinet (Fig. 10), panel 74 divides the interior of the cabinet, above the floor panel 46, into a pair of longitudinally spaced chambers, one of which receives the burner 62. Under conditions of either gravity or forced circulation, relatively cooler air enters such one chamber through the lower louver openings thereof, and serves to maintain the burner unit 62 in a relatively cool condition, as well as to supply air thereto for combustion purposes. Under no conditions of operation is air, which has been heated by extraction of heat from the heat transfer surfaces of the drum 60, caused to pass over the burner unit 62.

It will be appreciated from the foregoing that the drum 60 may be regarded as comprising three chamber portions, which may constitute, respectively, the second, third, and fourth quadrants of the burner unit 22. Of these, the first chamber portion is in the lower half of the drum, and directly receives heated gases from the burner 62, through the opening 85. This first or primary chamber portion or pass (designated $a$ in Fig. 10) communicates with the second chamber portion through the passage provided between the end of the baffle 76 and the end of the drum.

The third quadrant, designated $b$ in Figure 10, constitutes a secondary pass of the previously identified retroverted gas circuit through the expansion chamber, and, near its right-hand end, opens directly into the flue connection 68.

The fourth quadrant, designated $c$ in Figure 10, constitutes the draft regulator chamber, and communicates, through the opening 70, with a usual draft regulator 71, which is not illustrated in detail but which may be of the usual pressure controlled type, the size of the opening through which is automatically varied in accordance with the differential between the air pressures within and without the expansion chamber or drum 60.

In operation, it will be appreciated that, at low fire settings of the usual float controlled feed valve 90, the flame may be confined within the body of the burner 62, in which event the heated gas resulting from the combustion of the oil is discharged from the opening 85 into the primary pass $a$. At high fire settings of valve 90 on the other hand the flame is located within the pass $a$ and may, in extreme cases extend around the baffle 76 into the pass $b$.

As will be appreciated, heat is extracted from the heated gases in the expansion chamber, and is absorbed by the walls of such chamber, in part by radiation from the heated gas body and in part by direct conduction from the heated gas body to the chamber walls, the temperature of the gas stream being highest within the chamber portion $a$ and being lowest at the entrance to the flue connection 68. It will be noticed that the burner opening 85 is immediately adjacent the floor of the chamber $a$ as well as being adjacent the side walls of this chamber, thus enabling the walls, and particularly the under side of chamber $a$ to extract a substantial amount of heat from the gas stream and provide the low level heat transfer surfaces which are particularly characteristic of the present arrangement. Similarly, heat is absorbed by the side, end, and top walls of the chamber $b$, enabling such wall portions to act as effective heat transfer surfaces. In addition, an appreciable amount of heat is extracted from the gas stream by the walls of the draft regulator chamber $c$, enabling the walls of the chamber to function as additional heat transfer surfaces. The extraction of heat from the above-described heat transfer surfaces of the drum 60 is discussed below in connection with the operation of the heater as a whole.

The burner 62, as pointed out above, is described in detail and claimed in the aforesaid copending application Serial No. 740,454, to which reference is made for a complete description of the structure and operation thereof. For the purposes of the present application, it is sufficient to note that the burner comprises principally an inner elbow-like body, generally cylindrical in section, and composed of three individually cylindrical sections 100, 102, and 104, suitably secured together in end-to-end relation. The lower end of section 104 is closed by a floor 106, of gently sloping conical form, which floor constitutes a vaporizing surface for the fuel, which may be introduced thereinto through an inlet 108, disposed at the side thereof, and which directly communicates with the previously mentioned float controlled feed valve 90. Section 102 is provided at the rear with a short conduit section 110, having a cover 112, which assembly affords a lighting opening, through which a match, taper or the like may be dropped on the floor 106, to start the fire. Section 100 terminates in an annular flange 114, to which a usual annular baffle ring 116, is releasably secured, as by a series of circumferentially distributed screws 118. A mounting plate 120 is secured in place between the flange 114 and the ring 116, and the plate 120 is provided with apertured fittings 122 and 124, by which it may be releasably secured to the previously identified supporting partition 74, as by machine screws 123, 125 engaging caged nuts (undesignated) carried by panel 74. The stem of screw 125 at the forward side of the burner assembly is extended rearwardly and provided with a laterally bent handle portion 125' so that it may be easily manipulated by reaching in through either of the doors 34a, 43. Release of the fittings 122 and 124 by removal of the screws 123, 125 permits ready removal of the burner unit 62 as a whole, for purposes of inspection, repair, replacement or the like, through the rear door 43, it being noted that the float control valve 90 is mounted on the door but that its fittings 91 are readily releasable to permit the burner 62 and valve 90 to be withdrawn as a unit.

Burner 62 is provided with rows of circumferentially distributed primary air inlet openings 130, and with a series of secondary air inlet openings 132. The secondary openings 132 occupy the space between the burner ring 116, and the secondary baffle 134. The primary air openings 130 are distributed throughout most of the space between the ring 134 and the floor 106, a usual intermediate baffle 136 being located somewhat above the lowest series of openings 130. Preferably and as illustrated, the elbow-shaped burner chamber is provided with an enclosing shell 140 having a rear opening 142 to afford access to the lighting opening 110. Shell 140 is releasably secured to the previously identified mounting plate 120. The previously identified opening 142 affords a primary inlet for primary air, to the burner unit 62. Additionally, in the region of the secondary air openings 132, the shell 140 may be and preferably is provided with a series of secondary air inlet openings 144. It will be appreciated that shell 140 promotes stability of operation, by protecting the burner body against eddies, gusts, and the like.

The fuel tank 150 is illustrated as being mounted at the rear of the cabinet, by means of a shielding panel 152. Panel 152 is held, by its supports 154, in spaced relation to the rear panel 42, thus affording heat insulation for the tank 150. Preferably and as illustrated, further heat insulation for the tank 150, is provided by the previously identified rear baffle 28. Baffle 28 is provided with a flange 156 at one end thereof, by which it is adapted for connection to the previously identified partition 74. Additionally, baffle 28 is provided with a laterally turned flange 158, by which it is adapted for connection to the baffle portion 26a which constitutes an integral rearwardly turned extension of the front baffle 26. Baffle 28 is curved forwardly adjacent its lower edge, and extends toward the front underneath the drum 60. The main body portion of baffle 28 lies intermediate the rear wall of the drum 60, and the rear cabinet panel 42, and extends longitudinally from connection to baffle portion 26a at one end to partition 74 at the other.

The front and end baffle portions 26, 26a, respectively, comprise upstanding wall-like portions arranged to direct air flowing in through the lower slots 44, etc. upwardly into contact with the heat exchanger and to prevent the fan from drawing unheated air directly from the inlet slots 44. Baffle assembly 26, 26a is provided with a base flange 159, by which it is adapted for supporting connection to the cabinet floor 46, and rises to a height slightly above the height of the lowest series of air inlet louvers 44.

The fan unit 24 is illustrated as comprising a multi-bladed fan 160 of usual form, which is received within a cowling 162, provided therefor in upwardly projecting relation to the floor panel 46. Fan 160 is carried at the upper end of the drive shaft 164 of a usual electric motor 166, which may be conventionally mounted in an associated housing 168. Housing 168 is provided with a laterally turned duct portion 170, which serves as a passage for cooling air for the motor, which is drawn into the open underside of the housing 168, by an auxiliary motor cooling fan 172. Passage 170 also accommodates a lubricating fitting 174, and the operating connections 176 for the motor. Housing 168 is directly carried by the floor of the bottom cabinet panel 30 to promote a smooth flow of air through the previously identified plenum chamber 47, defined by the false floor panel 46 and the bottom floor panel 30. A supplemental shell 180 is provided, which encloses the motor housing 168, and is provided with sloping side and front walls. Shell 180 may be releasably secured to a flange 182 associated with the motor housing 168, as by bolts 184.

The previously identified inspection window 69 is shown in more detail in Figure 11, and comprises generically a generally rectangular cup-shaped glass 186, the marginal portions whereof are received in a channel 188 provided therefor in the side wall of the expansion chamber portion 66. Screws 190 serve to releasably hold the glass 186 in place. Glass 186 is surrounded by a generally rectangular bezel fitting 192. The reversely turned marginal portion 194 is adapted for connection to the front panel 40, and the inner marginal edge of the fitting 192 lies in slightly spaced relation to the margins of the glass 186, thus enabling fitting 192 to serve as an additional air inlet opening and preventing stressing of the glass in event of relative distortion of the heat exchanging drum and/or the cabinet due to heat, handling of the cabinet during moving thereof, or in event the unit is placed on an uneven floor.

Considering now the operation of the structure as a whole, it will be appreciated that when the fan 24 is not in operation, the heater functions as a gravity circulator. Under these conditions, all of the cabinet openings in the lower part of the cabinet serve as air inlet openings. These openings include the lowest set of louver openings 48, and the lower rows of louver openings 44 in the front and end panels of the cabinet, it being understood that air admitted through the slots 48 passes through the plenum chamber 47 and past the fan blades into the interior of the cabinet. Air thus admitted to the cabinet passes over the heated bottom, side and end walls of the expansion drum 60, absorbs heat therefrom by direct conduction, by convection, and by radiation, and is discharged into the surrounding space. This discharge takes place principally through the louvers 44 and the top panel 38 and in part may take place through the intermediate and upper louver openings 44 in the end panels of the cabinet. The air which is admitted through the lower louvers 44 in the end panel 34 passes over the burner unit 62, supplying the same with air for combustion purposes, and also affording a cooling action therefor. Before passing out of the cabinet, such air passes over the draft regulator chamber portion c of the expansion drum and extracts heat therefrom.

When the fan is in operation and the burner is at relatively high fire settings, the heater functions as a combination gravity circulator and forced circulator, for the reason that the fan, in the preferred embodiment shown, is not of sufficient capacity to entirely overcome the convection-induced airflow. More particularly, when in operation, the fan 24 draws air into the fan chamber (defined by the floor 26, partition 74, baffle 26, and to some extent, by the rear baffle 28), causing such air to travel past the highly heated lower side wall portions and under side of the drum 60. Such air may be expected to be drawn into the fan chamber largely through the lower series of louver openings 44 in the front and end panels of the cabinet, and is caused to rise high enough, by the baffle 26, to encounter at least the lower portions of the side walls of the drum. In order, however, to enable such air to be passed directly over the under side of the drum, and discharge into the plenum chamber 47, without requiring that the same shall be moved to any substantial extent in a contrathermal direction, it is preferred to terminate baffle 26 at the illustrated relatively low height. Because of the relative capacity of the fan, as stated above, some of the air admitted through the lower series of openings 44 may continue upwardly and be discharged at the top of the cabinet under the influence of gravity circulation, while under such conditions air may also enter the higher slots in the vertical walls and pass upwardly over the drum and from the top openings in the cover panel 38.

Virtually all air which is introduced into the plenum chamber 47, in this instance by the pulling force of the fan unit 24, passes immediately adjacent the hot under side of the drum 60 and is substantially heated thereof. Thereafter it passes into the plenum chamber 47 and is discharged therefrom into the surrounding space, at low level, through the slots 48. All such air passes into the room at low level and, it is to be particularly noted that the discharge takes place through a wide arc, represented in this instance by the front of the cabinet and both ends of the cabinet.

Figure 17:
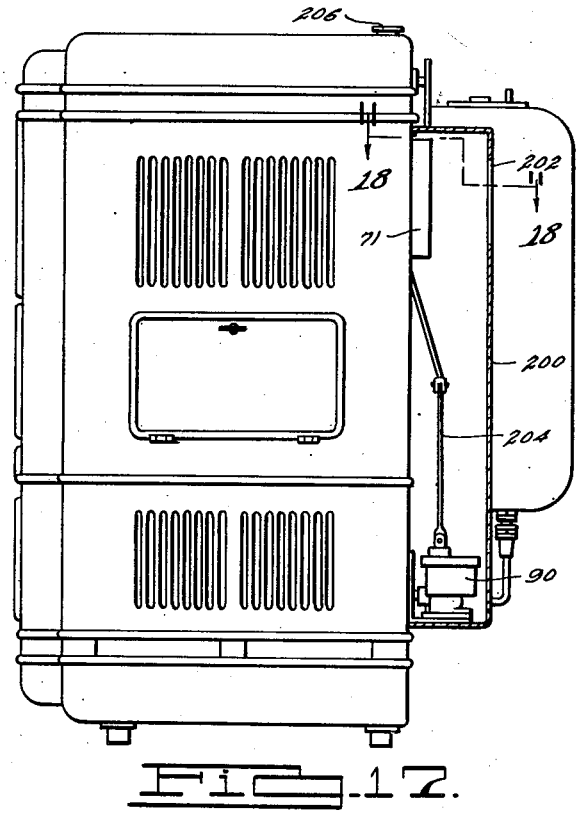
Figure 17 is a view in end elevation, illustrating a modification of the invention.
Figure 18:
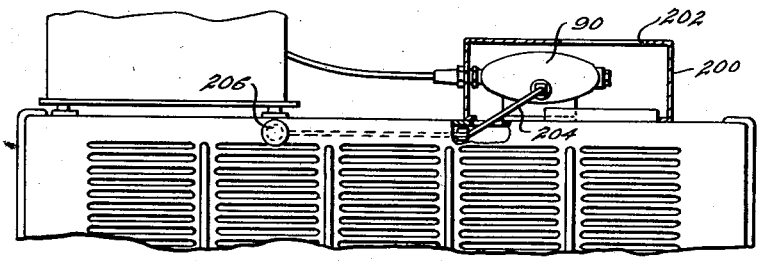
Figure 18 is a fragmentary view in top plan, of the embodiment of Figure 17, with certain of the parts broken away, so as to represent a section taken along the line 18—18 of Figure 17.

The modified embodiment of the invention shown in Figures 17 and 18 may and preferably does correspond in all respects to the embodiment described above, with the exception, that in this instance an enclosing shroud 200 is provided for the float valve 90. Shroud 200, which is secured to the rear panel of the cabinet, also encloses the draft regulator opening 70 and is provided with an opening 202, through which air is admitted to the draft regulator. It will be appreciated that shroud 200 effectively prevents any fumes which may escape from the valve 90 from entering the surrounding space, and instead, insures that such fumes shall pass directly to the flue by way of the draft regulator chamber. Figure 17 also illustrates an articulated connection 204, extending from the float valve 90, to an operator 206, located, for example, upon the top panel of the cabinet, which remote operating arrangement may, of course, be utilized in the embodiment of Figures 1 through 16.

It will also be appreciated that if the dual forced-air and convection action is not desired, the fan capacity may be so increased that it is capable of entirely reversing the flow of air through the cabinet, so that when the fan is operating the entire output of heated air is discharged from bottom slots 48. Preferably, however, the smaller blower of the character previously described is employed in order to secure the dual action mentioned. The use of a blower of lesser air moving capacity than the heater as a whole also results in quieter operation, lower first cost and lower operating cost, despite which more efficient heating results from the dual air flow.

Although only certain specific embodiments of the invention have been described in detail, it will be appreciated that various further modifications in the form, number, and arrangement of the parts may be made without departing from the spirit and scope of the invention.

We claim:

1. A space heater comprising a cabinet having upstanding front and end walls and a back wall and provided in said front and end walls with vertically spaced inlet and outlet openings for air to be heated, heating means within the cabinet and spaced from the walls and adapted when in operation to induce air flow through said openings and upwardly through the interior of the cabinet, said heating means comprising a heat-exchanging drum mounted within said cabinet and spaced from said walls, said inlet opening being located adjacent the level of the bottom of the drum a floor carried by the cabinet in spaced relation below the bottom of the drum, means for supporting the floor spacedly above a surface upon which the cabinet is adapted to be rested, and baffling means including a wall extending upwardly from said floor between said drum and said inlet opening to a height above the inlet opening but only slightly above the bottom of the drum and serving to prevent straight air flow from said inlet opening to the space between the bottom of the drum and the portion of said floor under said drum, said cabinet having an air outlet below the level of said floor, said portion of said floor under said drum having an opening communicating with said outlet, and a blower mounted in said cabinet and communicating with the space between the bottom of the drum and said floor portion and forcing air in said space through said floor opening to said outlet.

2. A space heater comprising a cabinet having upstanding front and end walls and a back wall and provided in said front and end walls with vertically spaced inlet and outlet openings for air to be heated, heating means within the cabinet and spaced from the walls and adapted when in operation to induce air flow through said openings and upwardly through the interior of the cabinet, said heating means comprising a heat-exchanging drum mounted within said cabinet and spaced from said walls, said inlet opening being located adjacent the level of the bottom of the drum a floor carried by the cabinet in spaced relation below the bottom of the drum, means for supporting the floor spacedly above a surface upon which the cabinet is adapted to be rested, and baffling means including a wall extending upwardly from said floor between said drum and said inlet opening to a height above the inlet opening but only slightly above the bottom of the drum and serving to prevent straight air flow from said inlet opening to the space between the bottom of the drum and the portion of said floor under said drum, said cabinet having an air outlet below the level of said floor, said portion of said floor under said drum having an opening communicating with said outlet, and a blower mounted in said cabinet and communicating with the space between the bottom of the drum and said floor portion and forcing air in said space through said floor opening to said outlet, said drum having superposed horizontally disposed retrovert heating passages therewithin, and burner means discharging into a lower one of said passages whereby heat may be extracted first from lower portions of the drum by upflowing air within the cabinet.

3. A space heater construction comprising a cabinet having walls, a floor element and means for supporting the same in a position spaced above a surface upon which the cabinet is adapted to be rested, heating means within the cabinet and spaced from the walls thereof, said heating means including a heat-exchanging drum, said cabinet having inlet and outlet openings formed therein and vertically spaced from one another whereby when said heating means is in operation movement of air may be induced by convection through said openings and upwardly through the interior of the cabinet, said openings including an inlet opening formed in a wall of said cabinet above said floor element, baffling means carried by said floor element and extending upwardly between the said inlet opening and said drum and terminating below the top of the cabinet, and blower means carried by said cabinet and mounted adjacent the floor element thereof, said drum being mounted above the floor element so that the bottom thereof is above the blower means, the space between the bottom of said drum and said blower means being substantially empty, said blower means having an inlet above said floor element and an outlet below said floor element and having an air moving capacity which is less than the total air moving capacity of the heater, said blower means being operative to direct a portion of the air from above the floor and which has been heated between heating means downwardly through the floor whereby it may be diffused outwardly in a substantially horizontal direction at a level below said floor element and above a surface upon which the heater is adapted to be rested.

4. The invention as set forth in claim 3 wherein said blower means is carried by said floor element within an area substantially enclosed by said baffling means.

5. The invention as set forth in claim 3 wherein said cabinet is provided with perforate front and end walls and a substantially imperforate back wall and including a baffling wall extending upwardly between said drum and said imperforate back wall and terminating at its upper end below the top of the cabinet and at its lower end in the area enclosed by said baffling means.

6. A space heater comprising a cabinet having upstanding walls, heating means within the cabinet and spaced from the walls comprising a hollow sheet metal heat-exchanging drum, said drum having a lower reentrant corner portion, closure means for said reentrant corner portion, said closure means including a vertical panel projecting laterally and downwardly from the drum and engaging the interior of the cabinet and serving to support the drum within the cabinet, burner means housed at least partly within the corner portion of the drum and discharging into the interior thereof through said closure means, said closure means extending upwardly and laterally inside at least a portion of the drum and within the drum to serve as baffling means between the burner and other portions of the drum.

7. The invention as set forth in claim 6 wherein said vertical panel defines a portion of the corner portion of the drum and said burner is mounted on said panel.

8. In a space heater having a cabinet with side walls and a floor, the combination of a heat exchange drum in said cabinet spaced slightly above said floor, a lower corner of said drum being reentrant, closure means for said reentrant corner including, a plate mounted on said floor and forming the face of said reentrant corner perpendicular to said floor, said plate extending into said drum and having a section thereof bent at an angle to said corner face and disposed parallel to said floor, the portion of said plate forming said face having an opening therein, a combustion unit in said corner portion secured to and mounted on said plate portion and discharging products of combustion through said opening into said drum, the angle portion of said plate serving as a baffle to confine said discharged gases to the portion of the drum adjacent said floor, a blower mounted on said floor directly beneath said drum, means in the cabinet providing inlet and outlet openings for air, said openings being located beneath the drum and in communication with said blower, and a baffle plate mounted on the floor between said blower and at least some of said openings and terminating at a level adjacent the bottom of the drum.

GEORGE M. SCHUEDER.
RAYMOND M. KROKOS.
PAUL A. TRACHT.

REFERENCES CITED

The following references are of record in the file of this patent:

UNITED STATES PATENTS

| Number | Name | Date |
|---|---|---|
| Re. 22,482 | Schueder | May 16, 1944 |
| 2,173,280 | Le Tourneau | Sept. 19, 1939 |
| 2,241,025 | Wedderspoon | May 6, 1941 |
| 2,263,362 | Logue | Nov. 18, 1941 |
| 2,276,614 | Grapp | Mar. 17, 1942 |
| 2,304,570 | Jain | Dec. 8, 1942 |

FOREIGN PATENTS

| Number | Country | Date |
|---|---|---|
| 529,977 | Great Britain | Dec. 3, 1940 |